United States Patent [19]

Gardiner et al.

[11] Patent Number: 5,777,013
[45] Date of Patent: Jul. 7, 1998

[54] DISPERSION AND ADHESION OF SILICA IN ELASTOMERIC MATERIALS

[75] Inventors: Eric S. Gardiner, Westtown; Xinya Lu, Spring Valley, both of N.Y.

[73] Assignee: Arizona Chemical Company, Panama City, Fla.

[21] Appl. No.: 788,931

[22] Filed: Jan. 24, 1997

[51] Int. Cl.[6] ................................................ C08L 25/10
[52] U.S. Cl. ........................ 524/274; 524/270; 524/505
[58] Field of Search ............................ 524/270, 274, 524/505

[56] References Cited

U.S. PATENT DOCUMENTS

| | | | |
|---|---|---|---|
| 1,930,853 | 10/1933 | Kollek et al. | 252/6 |
| 2,366,737 | 1/1945 | Loder et al. | 260/410.6 |
| 3,285,870 | 11/1966 | Vandenberg | 260/24 |
| 3,474,059 | 10/1969 | Body | 524/274 |
| 3,477,974 | 11/1969 | van Steveninck et al. | 260/18 |
| 3,897,410 | 7/1975 | Olstowski et al. | 260/18 TN |
| 4,017,452 | 4/1977 | Schwarz | 260/42.14 |
| 4,248,770 | 2/1981 | Matsuo | 524/270 |
| 4,373,041 | 2/1983 | Wood | 524/270 |
| 4,381,640 | 5/1983 | Chakravarti et al. | 57/242 |
| 4,838,556 | 6/1989 | Sullivan | 273/220 |
| 5,021,492 | 6/1991 | Sandstrom | 524/270 |
| 5,120,781 | 6/1992 | Johnson | 524/274 |
| 5,177,133 | 1/1993 | Peck | 524/270 |
| 5,217,573 | 6/1993 | Tsai et al. | 162/5 |
| 5,271,991 | 12/1993 | Gardiner et al. | 428/195 |
| 5,281,438 | 1/1994 | Gardiner et al. | 427/256 |
| 5,444,109 | 8/1995 | Wideman | 524/270 |

*Primary Examiner*—Paul R. Michl
*Attorney, Agent, or Firm*—Luedeka, Neely & Granam, P.C.

[57] ABSTRACT

The specification discloses elastomeric compositions and methods for making elastomeric compositions containing silica. The elastomeric composition comprises an elastomeric matrix containing from about 1 to about 40 wt. % silica and from about 0.1 to about 20 wt. % of an additive selected from the group consisting of rosin acid or fatty acid monoesters of glycerol and block copolymers having at least one A-block derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol. The additive provides substantial improvement in the dispersion and adhesion of silica in the elastomeric matrix which substantially improves the strength and other properties of the material.

33 Claims, 4 Drawing Sheets

DISPERSION AND ADHESION OF SILICA IN ELASTOMERIC MATERIALS

The invention relates to compositions and methods which improve the dispersion and adhesion of silica in elastomeric materials.

BACKGROUND

Many elastomeric materials such as natural and synthetic rubber products contain carbon black fillers to improve the properties of the rubber. The high surface area and small particle size of carbon black particles impart higher levels of reinforcement as reflected in the tensile strength, tear resistance and resistance to abrasive wear of rubber products such as tires.

Silica is also used in many polymeric and elastomeric compositions as a filler and has found wide acceptance in the tire industry as a partial replacement for carbon black because of its propensity to further improve the properties of the elastomeric materials. Silica promotes strength in tire applications, and also provides good wet traction. In contrast, carbon black promotes strength, but is deficient in promoting good wet traction. Hence, there is a benefit in using more silica and less carbon black in many tire applications.

When less than 10% by weight silica based on the total weight of the formulation is used, uniform melting, mixing and dispersion of the silica are the most important factors. Conventionally, high molecular weight polyethylene glycol (PEG) is used to disperse silica in a rubber formulation. However, PEG does not promote adhesion of the silica to the polymeric matrix.

For silica loadings of about 10% by weight or higher, adhesion between the silica and polymeric matrix becomes difficult. Without the use of relatively expensive silane coupling agents to promote adhesion of silica in the rubber formulation at loadings above about 10 wt. %, the strength of the formulation is adversely affected.

A wide range of additives have been proposed in an effort to address specific problems in production of elastomers and rubber-type materials. For example, U.S. Pat. No. 3,717,600 to Dalhuisen et al. discloses use of a combination of a water soluble surfactant and a plasticizer to aid the dispersion of MgO, which is used to reduce scorch and provide improved processing and storage safety of unvulcanized neoprene. The nonionic surface active agents disclosed by Dalhuisen et al. include mono and diglycerides, sorbitan fatty acid esters, polyoxyethylene sorbitan fatty acid esters, polyoxyethylene sorbitol esters, polyoxyethylene acids, fatty alcohols, polyethylene glycols, nonylphenoxypoly(ethylene-oxy)ethanols, fatty acid esters of glycerol, ethylene glycol, di-and polyethylene glycol and propylene glycol, and tetraesters of pentaerythritol and fatty acids. Ionic agents include alkyl aryl sulfonates. Dalhuisen et al. do not suggest any method or composition for improving the dispersion and adhesion of silica in rubber formulations.

U.S. Pat. No. 4,838,556 to Sullivan discloses use of a dispersing agent in the production of the core composition of a golf ball to increase the coefficient of restitution of the core. The golf ball core composition is based on polybutadiene and mixtures of polybutadiene with other elastomers, an unsaturated carboxylic acid, a free radical initiator and a dispersing agent. The dispersing agents include alkali metal salts of fatty acids, sodium salts of alkylated aromatic sulfonic acids, monoaryl and monoalkyl ethers of dialkylene glycols, ammonium salts of alkyl phosphates, sodium salts of carboxylated electrolytes, sodium alkyl sulfates and monosodium salt of sulfated methyl oleate. According to Sullivan, the core compositions may also include other components such as fillers, metal oxides, fatty acids and diisocyanates. Suitable fillers include silica, silicates, zinc oxide, carbon black, cork, titania, cotton flock, cellulose flock, leather fiber, plastic and/or leather flour, asbestos, glass fibers, metal carbonates and talc. However, the '556 patent does not describe a method for improving the adhesion of silica to a polymeric matrix.

U.S. Pat. No. 4,017,452 to Schwarz describes a tri-block copolymer composition which is used to modify an inorganic filler so that it will be readily dispersible in a thermoplastic polymeric resin. The block copolymer has an A-B-A structure wherein the A units are a homopolymer of ethylene oxide and the B unit is a homopolymer of propylene oxide. The mole ratio of ethylene oxide to propylene oxide is within the range of from about 40:60 to about 90:10 and the B-block has an average molecular weight of at least 3,000. The inorganic filler is modified by intimately mixing the block copolymer and inorganic filler at an elevated temperature so that the block copolymer wets the surfaces of the inorganic filler particles. The amount of inorganic filler in the mixture of filler and copolymer may range from about 5 % to about 95 % by weight. Because of the relatively small size of the B-block in relation to the A-block, the compositions exhibit substantially hydrophilic characteristics with very little if any hydrophobic properties. Accordingly, the compositions are not well suited for use in adhering silica to a polymeric matrix in essentially hydrophobic formulations such as rubber.

While many types of surfactants and dispersants have been proposed for use in the formulation of elastomeric materials, no solution is known to have been suggested for the problems associated with addition of silica to elastomeric materials which provides an effective and economical alternative to use of silane coupling agents.

Accordingly, it is an object of the present invention is to provide a process for dispersing silica in an elastomeric product.

Another object of the invention is to provide an additive which improves the adhesion of silica to an elastomeric matrix.

Still another object of the invention is to provide an additive which improves the dispersion of less than about 10% by weight silica in an elastomeric matrix.

Yet another object of the invention is to provide an additive which improves the adhesion of at least about 10% by weight silica in an elastomeric matrix.

A further object of the invention is to provide a method for improving the abrasive properties and strength of an elastomeric product containing a silica filler.

SUMMARY OF THE INVENTION

With regard to the above and other objects, the invention provides an elastomeric composition comprising from about 60 to about 98.9 wt. % elastomeric matrix including from about 1 to about 40 wt. % silica and from about 0.1 to about 20 wt. % of an additive selected from the group consisting of rosin acid or fatty acid monoesters of glycerol and block copolymers having at least one A-block derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol.

In another aspect, the invention provides a method for making an elastomeric material comprising compounding an elastomer selected from the group consisting of polyisoprene, polybutadiene, styrene-butadiene rubber (SBR) and ethylene- propylene-diene monomer (EPDM) and mixtures thereof with a preblended mixture comprising silica and from about 5 to about 50 % by weight based on the total weight of the mixture of an additive selected from the group consisting of rosin acid or fatty acid monoesters of glycerol and block copolymers having at least one A-block derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol and crosslinking the elastomeric material to provide an elastomeric matrix with the silica dispersed therein.

According to yet another aspect of the invention, a method is provided for making an elastomeric material which comprises mixing silica with an additive selected from the group consisting of rosin acid or fatty acid monoesters of glycerol and block copolymers having at least one A-block derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol, heating the mixture to a temperature in the range of from about 180° to about 220° C. for from about 10 minutes to about 1 hour, compounding the heat treated mixture with an elastomer and crosslinking the elastomeric material containing silica, additive and elastomer.

According to another aspect of the invention, an additive is provided for dispersing silica in an elastomeric material comprising a block copolymer having at least one A-block derived from the group consisting of rosin acids and fatty acids and a B-block having a number average molecular weight in the range of from about 200 to about 2500 daltons derived from a polyepichlorohydrin (PECH) polyol.

The invention enables a reduction in particle size and increased dispersion of silica as compared to the particle size and dispersion obtained when using polyethylene glycol alone as an additive. When silica is used to replace or augment carbon black as a reinforcing filler, the additive of the invention promotes better dispersion than conventional coupling agents and better adhesion between the silica and elastomer at a fraction of the cost of silane coupling agents.

BRIEF DESCRIPTION OF THE DRAWINGS

Other features and advantages of the invention will be evident from the ensuing detailed description and claims considered in conjunction with the accompanying drawings in which:

DETAILED DESCRIPTION OF THE INVENTION

The present invention provides a method for improving the dispersion and adhesion of silica in elastomeric materials using an additive having an A-B or A-B-A structure wherein the A-blocks are selected from rosin acids and fatty acids and the B-blocks are selected from glycerol, PEG and PECH polyols wherein the PEG or PECH polyols which may be used as the B-block have an average molecular weight in the range of from about 200 to about 2500 daltons.

The invention is applicable to a wide range of elastomers including, but not limited to, polymers, copolymers and terpolymers of substituted and unsubstituted olefinic compounds, arene compounds and olefinic and arene compounds such as natural and synthetic rubber, styrene-butadiene rubber (SBR), polyisoprene (P), butyl rubber, halogenated butyl rubbers, chlorosulfonated polyethylene, polybutadiene (PBD), nitrile rubber, chloroprene rubbers, and ethylene-propylene terpolymers such as ethylene-propylene-diene monomer (EPDM).

Additive compositions according to the invention which promote the adhesion and/or dispersion of silica in such elastomers have the general structure A-B or A-B-A provided by reacting a fatty or rosin acid and a compound selected from the group consisting of glycerol, PEG or PECH polyol. Fatty acids which may be used as the A-blocks of the A-B or A-B-A composition include the $C_{18}$–$C_{24}$ unsaturated fatty acids selected from elaidic acid, petroselinic acid, elaeostearic acid, arachidonic acid, oleic acid, linoleic acid, linolenic acid, erucic acid, brassidic acid and mixtures of two or more of the foregoing acids. Particularly preferred fatty acids are the $C_8$ to $C_{24}$ mono- and di-unsaturated tall oil fatty acids having an acid number of greater than about 170 and which are substantially hydrophobic in nature.

The rosin acids include the abietic and pimaric types having the general formula $C_{20}H_{28-32}O_2$ with a partially hydrogenated phenanthrene nucleus. Rosin acids and tall oil fatty acids are conventionally derived from extract, acidified, fractionated and isolated from the waste liquors of the alkaline pulping of wood chips from pine trees.

The B-block of the A-B or A-B-A additive is glycerol or a polymeric compound derived from a polyhydric alcohol preferably a dihydric alcohol having at least two terminal hydroxyl groups. Suitable polyhydric alcohols which may be used to make the B-blocks of the additive include polyethylene glycol (PEG), polypropylene glycol (PPG) polybutylene glycol (PBG), polyepichlorohydrin (PECH) polyol and the like. One particularly preferred B-block material is polyethylene glycol (PEG) having a number average molecular weight in the range of from about 200 to about 1000 daltons, most preferably from about 300 to about 500 daltons. An especially preferred B-block material is PECH polyol having a number average molecular weight in the range of from about 500 to about 2500 daltons, most preferably from about 1000 to about 1500 daltons. As used herein, "polyol" means two or more hydroxyl groups. Preferably the PECH compound is a linear PECH diol having polydispersity index of less than about 1.5.

The PECH polyol may be made by polymerizing epichlorohydrin in bulk in the presence of an initiator selected to produce a teleomeric polyol and a polymerization catalyst. The initiators may be selected from the group consisting of ethylene glycol, 1,4-butanediol, 1,6-hexanediol and glycerol and the catalyst may be selected from the group of Lewis acid catalysts such as $BF_3$, $AlCl_3$, $FeCl_3$ and the like. Th amount of initiator relative to the amount of epichlorohydrin preferably ranges from about 0.05 to about 0.15 moles of initiator per mole of epichlorohydrin and the amount of catalyst ranges from about 0.0005 to about 0.010 moles of catalyst per mole of epichlorohydrin.

The reaction temperature during polymerization of the epichlorohydrin may be controlled by the rate of feed of the epichlorohydrin monomer to the reaction mass. By controlling the reaction temperature, a target average molecular weight of the PECH may be achieved. For example, a higher temperature promotes a more vigorous reaction resulting in a shorter chain PECH polyol whereas a lower reaction temperature promotes a slower reaction resulting in longer chain polymer. It will be recognized by those of ordinary skill in the art that the reaction temperature may be controlled by various means such as external cooling of the reaction vessel, cooling coils in the reaction vessel, dilution of the reactants with an inert solvent and the like. The method used for controlling the reaction temperature is dependent, to a large extent, on the design of the reaction vessel and reaction cooling system available. It has been found, however, that suitable control of the reaction temperature may be obtained by the rate of addition of epichlorohydrin to the reaction mass. Hence, it is preferred to prepare the PECH polyol in the absence of solvent.

The additive used in the compositions and methods of the invention may be prepared from the rosin acids or fatty acids and polyhydric alcohols by conventional condensation reaction techniques. In particular, the additive may be made by reacting glycerol with a slight excess of over one equivalent weight of the acid, by reacting a polyethylene glycol with a slight excess over two equivalent weights of the acid or by reacting a PECH polyol with a slight excess of over two equivalent weights of the acid. The reaction between the acid and glycerol, PEG or PECH is preferably conducted at a temperature in the range of from about 200° to about 300° C. under a nitrogen blanket in the presence of from about 0.2 to about 0.8 grams of an acidic catalyst which may be selected from $H_3PO_2$ and para-toluene sulfonic acid for from about 10 to about 50 hours. During the reaction, the reaction mass is stirred under a nitrogen atmosphere and water is removed from the reaction vessel and collected as condensate. After completion of the reaction, the reaction mass product is stripped under subatmospheric pressure of unreacted acid. Methods which may be used for preparing the additive are more fully described in U.S. Pat. No. 5,271,991 to Gardiner et al. and U.S. Pat. No. 5,240,985 to Gardiner, incorporated herein by reference as if fully set forth.

When a rosin acid or fatty acid is selected as the A block reactant, the acid is preferably first converted to its acid chloride in order to reduce the occurrence of side reactions. The acid is converted to its acid chloride by reacting about one mole equivalent of acid dissolved in a suitable solvent such as toluene or xylene with about one mole equivalent of $PCl_3$. The reaction with $PCl_3$ is conducted at a temperature ranging from about 40° to about 80° C. under typical batch conditions. A reaction time of about 2 to about 5 hours is typical. At the end of the reaction period, the temperature of the reaction mass is increased to above about 100° C. in order to remove any excess $PCl_3$.

During the reaction of acid and glycerol or other polyhydric alcohol, an acid scavenger such as pyridine or triethylamine is preferably added to the reaction mass to complex and remove inorganic acid which is formed. The pyridinium or ammonium salt may be removed from the block copolymer product by filtration, precipitation, centrifugation, decantation and the like. The reaction mass solvent may be removed by heating the reaction product to a temperature sufficient to vaporize or distill the solvent from the reaction mass.

The molecular weight of the mono- or diesters is determined by the molecular weights of the mid block and end blocks. The overall molecular weight of the additive is typically in the range of from about 1500 to about 2100 with a polydispersity index essentially the same as the starting polymeric diol.

Solvents which may be used to conduct the tri-block formation reaction are selected from non-polar inert solvents having boiling points about 70° C. such as toluene and xylene. Halogenated solvents such as methylene chloride or chloroform may also be used. However, where the polydispersity of the product is important to the product's performance, it is preferred to avoid the use of halogenated solvents which may result in a substantial increase in polydispersity of the resulting product.

The PEG or PECH polyol may be reacted as is with a rosin acid or fatty acid selected for providing the A block of the mono- or diester. In general, there is no need to purify the PECH polyol prior to reaction.

The silica may be any silica conventionally used in elastomeric compositions including precipitated silica such as fumed or pyrogenic silica composed of from about 80 to about 99.9 % by weight $SiO_2$. It is preferred that the silica be in a relatively fine, subdivided state so that it has an average particle size in the range of from about 1 to about 100 nm for optimal dispersion in the elastomeric material. The silica generally may have a surface area ranging from about 45 to about 700 $m^2$/gram, preferably from about 100 to about 300 $m^2$/gram, and a bulk density ranging from about 0.03 to about 0.3 gram/$cm^3$.

The amount of silica used in the elastomeric material may range from about 2 to about 40 percent by weight of the total weight of the material. When the amount of silica in the composition is less than 10 percent by weight, it is important to provide a substantially homogeneous dispersion of silica in the composition so that it associates with metal reinforcing cords to promote adhesion between the cords and the polymeric matrix. Dispersion of the silica in the composition may be determined by microscopic examination of a cast polymeric film containing the silica.

When the amount of silica exceeds 10 percent by weight, it is important that the adhesion of silica to the elastomeric matrix be sufficient to promote the strength of the elastomeric product. The adhesion between the elastomeric matrix and the silica is usually determined by various physical test methods on the finished composite followed by microscopic examination of the test specimen.

It is a feature of the invention that the dispersion and adhesion of silica in an elastomer is improved by compounding the elastomer with a mixture of silica and the above described additive provided by preblending the silica and the additive in order to cause the additive to coat the surface of the silica, with or without the use of a solvent, and then heating the blend at a temperature in the range of from about 180° to about 220° C. for from about 10 minutes to about 1 hour. The coated silica particles are observed to more readily disperse in the elastomer and to undergo less coalescence during cross-linking of the elastomer.

Because the additive may be a viscous liquid at room temperature, silica may be suitably coated with the additive by heating the additive with the silica to a temperature in the range of from about 70° to about 120° C., or a solvent may be used which dissolves the additive so that it readily wets the surface of the silica at room temperature. Suitable solvents for dissolving the additive include inert solvents such as toluene and xylene, alkanes such as hexane, heptane, decane and the like and petroleum oils. After mixing the silica and dissolved additive, the solvent is preferably evaporated from the mixture prior to compounding the same with the elastomer unless the solvent is part of the formulations such as a process oil.

With the coated silica intimately mixed therein, the elastomer is cured to induce formation of cross-link bonds between adjacent elastomer molecules to provide an elastomeric matrix with the coated silica particles finely dispersed therein. Curing of the elastomeric formulation may be conducted by using curing or cross-linking agents such as sulfur or dicumyl peroxide. Mixing of the coated silica and the elastomer may be conducted by any of the methods known to those of ordinary skill in the art. Accordingly, the elastomer and coated silica may be melt blended in a thermostatted vessel, a Banbury mixer, roll mill or extruder with or without the use of a process oil. Suitable process oils include the process oils typically used in Rubber technology which are generally hydrophobic (non-polar) process oils. Alternatively, solid elastomer and the coated silica may be dry mixed and then melted in a mixing vessel to disperse the silica in the polymeric material.

Without desiring to be bound by theoretical considerations, it is believed that the additive is cross-linked in place on the surface of the silica so that it substantially encapsulates the silica particles. Good dispersion and/or adhesion of silica in the elastomeric matrix is promoted by the hydrophobic A-block portion of the additive in contrast to the substantially polar characteristics of the silica itself.

In order to facilitate a further understanding of the invention, the following nonlimiting examples illustrate one or more aspects thereof.

EXAMPLE 1
Synthesis of a Polyepichlorohydrin Diol

Epichlorohydrin (ECH) was polymerized in bulk in the presence of ethylene glycol as an initiator and $BF_3$ catalyst. The reaction was conducted in a 2-liter, three-necked flask fitted with a mechanical stirrer, finnel, condenser and thermometer. The reaction was conducted while maintaining the flask in a water bath at 20° C. A total of 400 grams of epichlorohydrin was slowly added to a solution of 0.25 grams of $BF_3$ in 25 grams of ethylene glycol at rate of about 20 grams per hour. Following the 20 hour addition of epichlorohydrin, the reaction mass was held in the water bath at 20° C. for an additional 4 hours. At the end of the reaction period, 300 iL of deionized water was added into the reaction mixture with stirring to inactivate the catalyst. The organic phase in the flask was then separated from the aqueous phase and the organic phase was dried at 40° C. under vacuum for one day. The polymerization temperature was controlled by adding the epichlorohydrin slowly so that the reaction temperature did not exceed 25° C. thereby obtaining a linear polyepichlorohydrin (PECH) diol having a relatively narrow molecular weight distribution with a polydispersity of about 1.2. The number average molecular weight and weight average molecular weight of the PECH diol as determined by gel permeation chromatography (GPC) were about $1400M_n$ and $1700M_w$.

In order to demonstrate the effect the reaction temperature and ECH addition rate had on the molecular weight distribution of the resulting PECH diol product, the ECH addition rate and reaction temperature were varied. The results are listed in Table 1 below.

TABLE 1

| Sample No. | Epichlorohydrin (grams) | Ethylene glycol (grams) | Catalyst Weight (grams) | Reaction Temp. (°C.) | ECH Addition Rate (g/min) | No. Average Molecular Weight (daltons) |
|---|---|---|---|---|---|---|
| 1 | 400 | 25 | 0.25 | 20 | 0.33 | 1400 |
| 2 | 400 | 25 | 0.18 | 25 | 1.00 | 1800[1] |
| 3 | 400 | 25 | 0.25 | 25 | 0.33 | 1300 |
| 4 | 400 | 25 | 0.32 | 30 | 0.33 | 1000[1] |
| 5 | 400 | 25 | 0.16 | 25 | 0.33 | 2000 |
| 6 | 50 | 2.4 | 0.03 | 20 | 0.25 | 1450 |
| 7 | 400 | 20 | 0.23 | 22 | 0.66 | 1430 |
| 8 | 400 | 20 | 0.23 | 22 | 0.45 | 1390 |
| 9 | 400 | 20 | 0.23 | 18 | 0.25 | 1400 |

[1]Product discolored by side reactions.

EXAMPLE 2
Synthesis of a Polyepichlorohydrin Derived Additive

An A-B-A tri-block copolymer was made by esterifying the hydroxyl end groups of the PECH diol of Sample No. 1 from Example 1 with two equivalents of tall oil fatty acid having a molecular weight of 282 grams per mole in a 2 liter, round bottom, 3-necked flask equipped with a thermometer, stirrer, nitrogen inlet and outlet and condenser. To reduce the occurrence of side reactions, the tall oil fatty acid was first converted to the fatty acid chloride and 0.35 moles of PECH diol was then added into 0.7 moles of fatty acid chloride dissolved in 300 mL of toluene in a 1000 mL reaction vessel. A reaction temperature of 105°–110° C. was maintained over a 3 hour period while the reaction mass was under a nitrogen blanket. Pyridine was added to the reaction mass as an HCl scavenger in order to precipitate pyridinium hydrochloride. The precipitated pyridinium hydrochloride was filtered from the reaction product solution and the solvent was removed by distilling the reaction product at 110° C. under a vacuum of 4 to 6 mm Hg. The resulting A-B-A tri-block copolymer had an acid number of 5.6 mg KOH/gram of sample.

EXAMPLE 3
Synthesis of Rosin or TOFA/PEG Resins

Polymeric resin diesters of PEG containing rosin or TOFA A-blocks were prepared by reacting a polyethylene glycol of the indicated molecular weight with a slight excess of over two equivalent weights of rosin or TOFA under the reaction conditions shown in Table 2. The additive was produced in a reactor under a nitrogen blanketing and with stirring. An exit condenser was used to condense water generated during the reaction. An acidic catalyst was employed for convenience. Table 2 summarizes the reaction conditions used to produce the PEG resins.

TABLE 2

| Acid | | PEG Mol. | | Catalyst | | Reaction Condition | |
|---|---|---|---|---|---|---|---|
| Type | Weight (grams) | Wt. (Wn) | Weight (grams) | Type | Weight (grams) | Time (hours) | Temp. (°C.) |
| TORA[1] | 520 | 400 | 300 | $H_3PO_2$ | 0.6 | 29 | 260 |
| Wood Rosin[2] | 543 | 400 | 300 | $H_2SO_4$ | 0.2 | 39 | 270 |
| Gum Rosin | 506 | 400 | 300 | $H_3PO_2$ | 0.6 | 25 | 270 |
| Dist. TORA[3] | 482 | 400 | 300 | $H_3PO_2$ | 0.6 | 28 | 270 |
| TOFA[4] | 208 | 400 | 249 | $H_3PO_2$ | 0.3 | 22 | 220 |
| SYLFAT D-1[5] | 200 | 400 | 100 | $H_3PO_2$ | 0.5 | 7 | 200 |

[1]TORA - ACINTOL R Types S tall oil rosin commercially available from Arizona Chemical Company of Panama City, Florida.
[2]Wood Rosin - is WW Wood Rosin available from Hercules Incorporated of Wilmington, Delaware.
[3]Dist. Rosin is BEVIROS 95 distilled tall oil rosin commercially available from Arizona Chemical Company of Panama City, Florida.
[4]TOFA - ACINTOL EPG tall oil fatty acid commercially available from Arizona Chemical Company of Panama City, Florida.
[5]SYLFAT D-1 - is a mixture of mainly $C_{18}$ branched fatty acids commercially available from Arizona Chemical Company of Panama City, Florida.

EXAMPLE 4
Preparation of Silica and Additive

Prior to dispersing the silica in an elastomeric formulation the silica was treated with the additive of the invention made generally in accordance with the procedures of Examples 2 and 3. The particular additive used to coat the silica particles is indicated in column 4 of Tables 3 and 4.

In order to treat the silica, the appropriate weight ratio of additive to silica indicated in Table 3 was used. The additive was dissolved in 200 niL of toluene. Then the corresponding weight ratio of precipitated silica was added to the solution of additive and the mixture was jar milled at room temperature for one hour. After mixing, the mixture was heated to 45° C. under vacuum to evaporate essentially all of the solvent. A dry solid comprised of silica coated with the additive was obtained.

EXAMPLE 5
Preparation of Heat-treated Silica and Additive

As in Example 4, an appropriate weight ratio of additive to silica as indicated in Table 4 was used to treat the silica. The additive was dissolved in 200 mL of toluene. Then the corresponding weight ratio of precipitated silica was added to the solution of additive and the mixture was jar milled at room temperature for one hour. After mixing, the mixture was heated to 45° C. under vacuum to evaporate essentially all of the solvent. After evaporating the solvent, the silica containing the additive was heated to 200° C. for 30 minutes. A dry solid comprised of heat treated silica coated with the additive was obtained.

The additive coated silica in the amounts indicated in Tables 3 and 4 was added to the various polymeric materials to determine the dispersion and adhesion properties of the silica in the formulations. Adhesion of the silica to the polymeric matrix was determined by rheological measurements which indicate the stiffness of the cured samples. Increased stiffness with reduced chain motion (loss) are characteristics of a reinforcement effect with good adhesion of the filler to the polymeric matrix. The dispersion efficiency was determined by microscopic examination of solution cast rubber films. Both Scanning Electron Microscopy (SEM) and optical microscopy with cross-polarization (CPOM) were used to determine the uniformity of dispersion and relative particle size of the silica.

In order to determine the dispersion efficiency of the additive of the invention, both scanning electron microscopy and optical microscopy with cross-polarization were used to examine solution cast elastomeric films. Elastomeric films were cast onto glass or carbon substrates from 3% by weight solutions of the elastomeric compositions in toluene. Silica concentrations in the elastomeric compositions ranged from 2 to 10% by weight of the compositions. The dispersion efficiency was based on the uniformity of the dispersion and relative particle size of the particles.

Cured elastomeric properties were determined from molded elastomeric sheets containing silica. The elastomeric films were cast into release boats from 7% by weight of the elastomeric compositions in toluene. Each film contained 3 % by weight of dicumyl peroxide as a crosslinking agent. Pigment loadings were 10 to 20% by weight silica and 0 to 10% by weight carbon black based on the total weight of the composition. After removing the solvent from the cast films, the films were laminated and compression molded at 125 psig pressure at 177° C. Molded sheets were tested as 8 mm discs in a Rheometrics RDS II analyzer using frequency modulation at isothermal conditions (25°, 50° or 70° C.).

TABLE 3

Dispersion Of Silica in Cast Films

| Run No. | Rubber | Silica (wt. %) | Additive (Ad.) | Weight Ratio of Ad. on Silica | Uniformity | Particle Size |
|---|---|---|---|---|---|---|
| 1 | polyisoprene | 2 | None | — | poor | small |
| 2 | polybutadiene | 2 | None | — | poor | small |
| 3 | polyisoprene | 2 | PEG 8000[1] | 1 to 1 | fair | many large aggregates |
| 4 | polyisoprene | 2 | Rosin/PEG 400 | 1 to 1 | fair to poor | some large aggregates |
| 5 | polyisoprene | 2 | TOFA/PEG 400 | 1 to 1 | good | no large aggregates |
| 6 | polyisoprene | 2 | Rosin/PECH | 1 to 1 | good | no large aggregates |
| 7 | polyisoprene | 2 | TOFA/PEG 400 | 0.5 to 1 | good | some large aggregates |
| 8 | polyisoprene | 2 | Rosin/PECH | 0.5 to 1 | good | fewer than Run No. 7 |
| 9 | polyisoprene | 2 | TOFA/PECH | 0.5 to 1 | excellent | many particles per area |
| 10 | polyisoprene | 2 | TOFA/glycerol | 0.5 to 1 | very good | some large aggregates |
| 11 | polyisoprene | 2 | rosin/glycerol | 0.5 to 1 | good | some large aggregates |

TABLE 3-continued

Dispersion Of Silica in Cast Films

| Run No. | Rubber | Silica (wt. %) | Additive (Ad.) | Weight Ratio of Ad. on Silica | Uniformity | Particle Size |
|---|---|---|---|---|---|---|
| 12 | polybutadiene | 2 | TOFA/PEG 400 | 0.5 to 1 | good | — |
| 13 | polybutadiene | 2 | TOFA/glycerol | 0.5 to 1 | very good | — |
| 14 | polybutadiene | 2 | rosin/PECH | 0.5 to 1 | very good | some large aggregates |
| 15 | EPDM | 2 | TOFA/PECH | 0.5 to 1 | good | some large aggregates |
| 16 | polyisoprene | 10 | TOFA/PECH | 0.5 to 1 | excellent | — |
| 17 | polyisoprene | 10 | rosin/PECH | 0.5 to 1 | very good | — |
| 18 | polyisoprene | 10 | TOFA/glycerol | 0.5 to 1 | very good | — |
| 19 | polyisoprene | 10 | rosin/glycerol | 0.5 to 1 | good | some large aggregates |
| 20 | polyisoprene | 10 | TOFA/glycerol (heated) | 0.5 to 1 | excellent | — |
| 21 | polyisoprene | 10 | TOFA/PECH (heated) | 0.5 to 1 | excellent | — |

[1]PEG 8000 - polyethylene glycol having an average molecular weight of about 8000 daltons.

As illustrated in the foregoing table, at 2 wt. % of silica in polyisoprene uniform dispersion of small silica particles was obtained with TOFA/glycerol (Run 10) at a ratio of 0.5 parts of TOFA/glycerol per part of silica. TOFA/PEG 400 (Run 5) at a ratio of 1 part of TOFA/PEG 400 per part of silica and at a ratio of 0.5 parts of TOFA/PEG 400 per part of silica (Run 7). Likewise, good dispersion was also obtained with rosin/PECH at a ratio of 1 part of rosin/PECH per part of silica (Run 6) and at 0.5 parts of rosin/PECH per part of silica (Run 8) and rosin/glycerol (Run 11). The best results were obtained with 0.5 parts of TOFA/PECH per part of silica at a silica loading of 2 wt. % (Run 9).

Similar results were obtained at a 2 wt. % loading of silica in polybutadiene and EPDM using TOFA/PEG 400 or TOFA/PECH (Runs 12 and 15). For polybutadiene, the best results were obtained with 0.5 parts of TOFA/glycerol or rosin/PECH per part of silica (Runs 13 and 14).

At silica loadings of 10 wt.% silica in polyisoprene, good results are obtained with rosin/glycerol at 0.5 parts of rosin/glycerol per part of silica (Run 19). Very good results were obtained with rosin/PECH and TOFA/glycerol at 0.5 parts of the additive per part silica (Runs 17 and 18).

However, excellent results were obtained when the TOFA/ glycerol or TOFA/PECH was heated with the silica prior to mixing the silica with the additive (Runs 20 and 21). The results may be compared with formulations which contain silica and no additive (Runs 1 and 2) and formulations which contain PEG 8000 as a dispersing aid for the silica.

The following table illustrates the effect annealing of the cast rubber films of Table 3 has on the coalescence of the silica in the formulation. In Runs 1–21 of Table 4, the rubber film containing silica was heated for 20 minutes at 100° C. The more the coalescence of the silica is suppressed the smaller the particles and the more uniform the dispersion of silica in the formulation.

TABLE 4

Effect of Film Annealing on Silica Dispersion

| Run No. | Rubber | Silica (wt. %) | Additive (Ad.) | Wt. Ratio of Ad. on Silica | Description |
|---|---|---|---|---|---|
| 1 | polyisoprene | 2 | None | — | particle size increase, number of particles decreases |
| 2 | polybutadiene | 2 | None | — | particle size increase, number of particles decreases |
| 3 | polyisoprene | 2 | PEG 8000 | 1 to 1 | particle size increase, particles decrease, dispersion uniform |
| 4 | polyisoprene | 2 | Rosin/PEG 400 | 1 to 1 | particle size increase, particles decrease, dispersion uniform |
| 5 | polyisoprene | 2 | TOFA/PEG 400 | 1 to 1 | particles grow but to less extent than Runs 3 and 4 |
| 6 | polyisoprene | 2 | Rosin/PECH | 1 to 1 | some particle growth and migration |
| 7 | polyisoprene | 2 | TOFA/PEG 400 | 0.5 to 1 | particles grow but to less extent than Runs 3 and 4 |
| 8 | polyisoprene | 2 | Rosin/PECH | 0.5 to 1 | some particle growth and migration |
| 9 | polyisoprene | 2 | TOFA/PECH | 0.5 to 1 | some particle growth, much less than Run 8 |
| 10 | polyisoprene | 2 | TOFA/glycerol | 0.5 to 1 | some particle growth and migration |
| 11 | polyisoprene | 2 | rosin/glycerol | 0.5 to 1 | particles grow but to less extent than Runs 3 and 4 |
| 12 | polybutadiene | 2 | TOFA/PEG 400 | 0.5 to 1 | some particle growth, much less than Run 8 |
| 13 | polybutadiene | 2 | TOFA/glycerol | 0.5 to 1 | some particle growth and migration |
| 14 | polybutadiene | 2 | rosin/PECH | 0.5 to 1 | some particle growth, much less than Run 8 |
| 15 | EPDM | 2 | TOFA/PECH | 0.5 to 1 | not tested |
| 16 | polyisoprene | 10 | TOFA/PECH | 0.5 to 1 | dispersion uniform, some growth of large particles |
| 17 | polyisoprene | 10 | rosin/PECH | 0.5 to 1 | more particle growth than Run 16 |
| 18 | polyisoprene | 10 | TOFA/glycerol | 0.5 to 1 | more particle growth than Run 16 |
| 19 | polyisoprene | 10 | rosin/glycerol | 0.5 to 1 | more particle growth than Run 17 |
| 20 | polyisoprene | 10 | TOFA/glycerol (heated) | 0.5 to 1 | dispersion uniform, some growth of large particles |
| 21 | polyisoprene | 10 | TOFA/PECH (heated) | 0.5 to 1 | no particle growth or migration |

In Table 4, the best results were obtained with TOFA glycerol and TOFA/PECH at a ratio of the additive to silic of 0.5 to 1 for a loading of 10 wt. % silica in polyisopren (Runs 20 and 21). However, all of the formulations (Run 4–19) enhanced dispersion of the silica in polyisoprene an polybutadiene as compared to formulations which do no contain the additive, and promoted smaller particle size.

Figure 1:
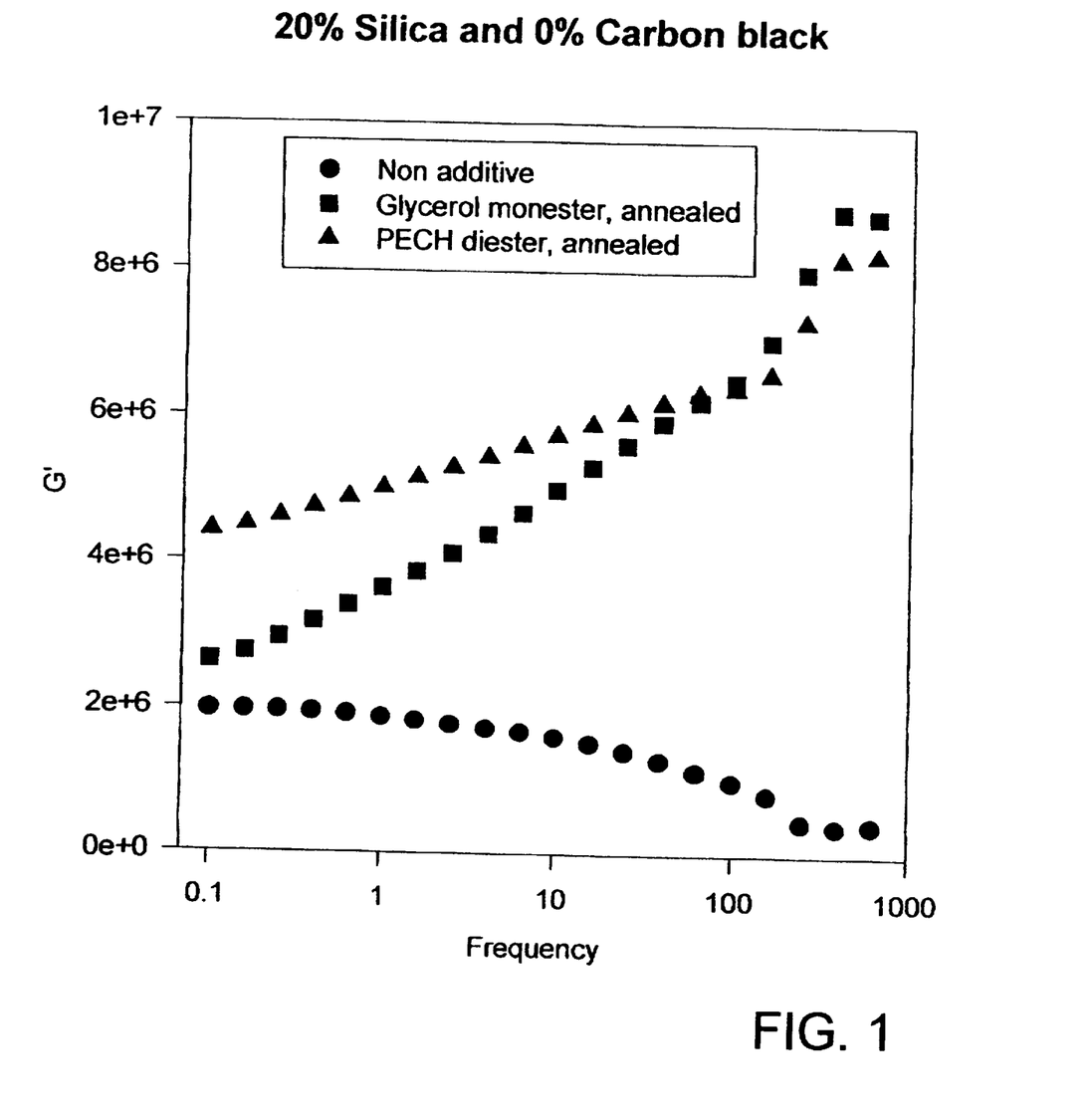
FIG. 1 is a graphical representation of the storage modulus (G') versus frequency for elastomeric materials containing 20 % by weight silica.
Figure 2:
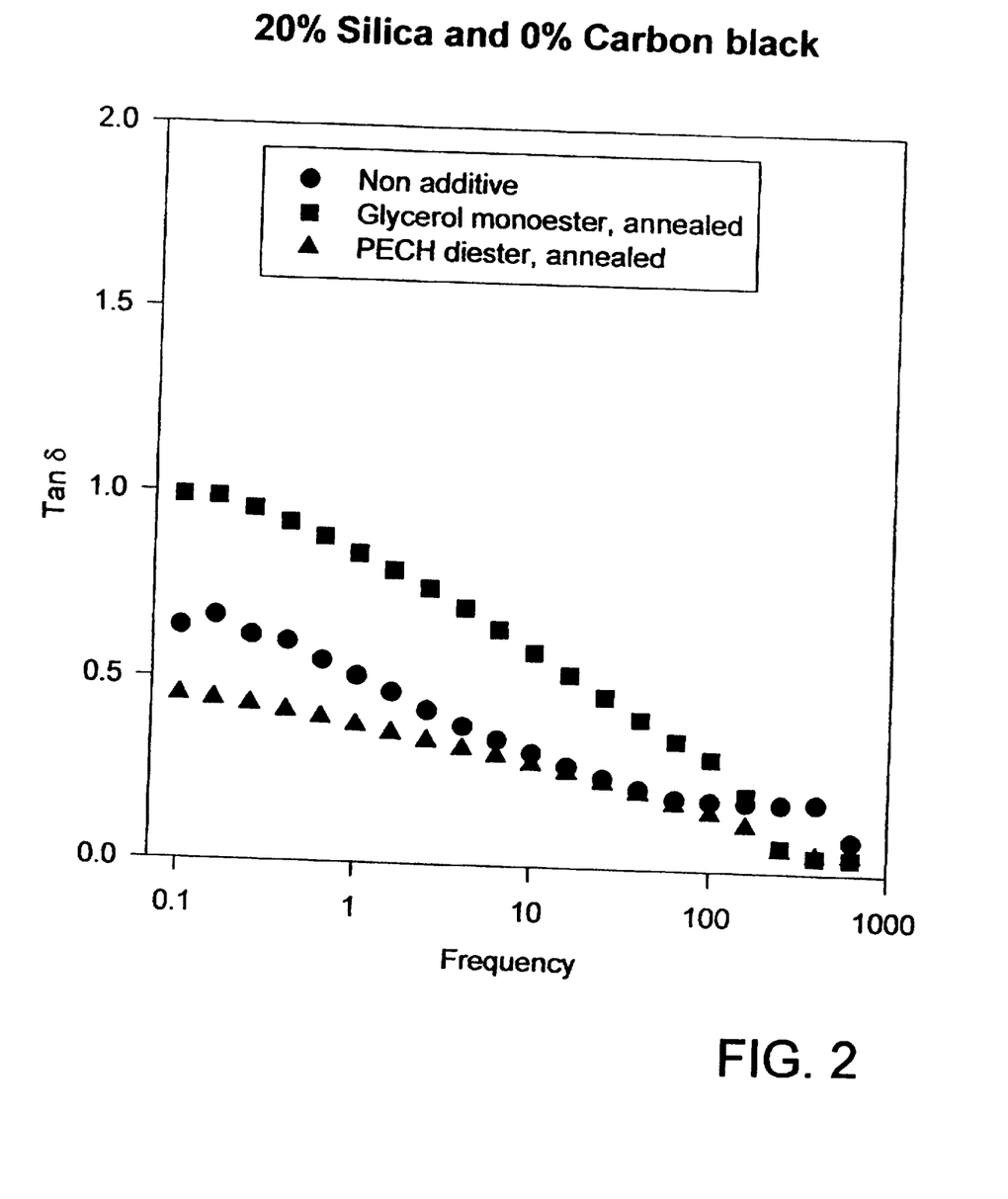
FIG. 2 is a graphical representation of the tan δ versus frequency of elastomeric materials containing 20% by weight silica.
Figure 3:
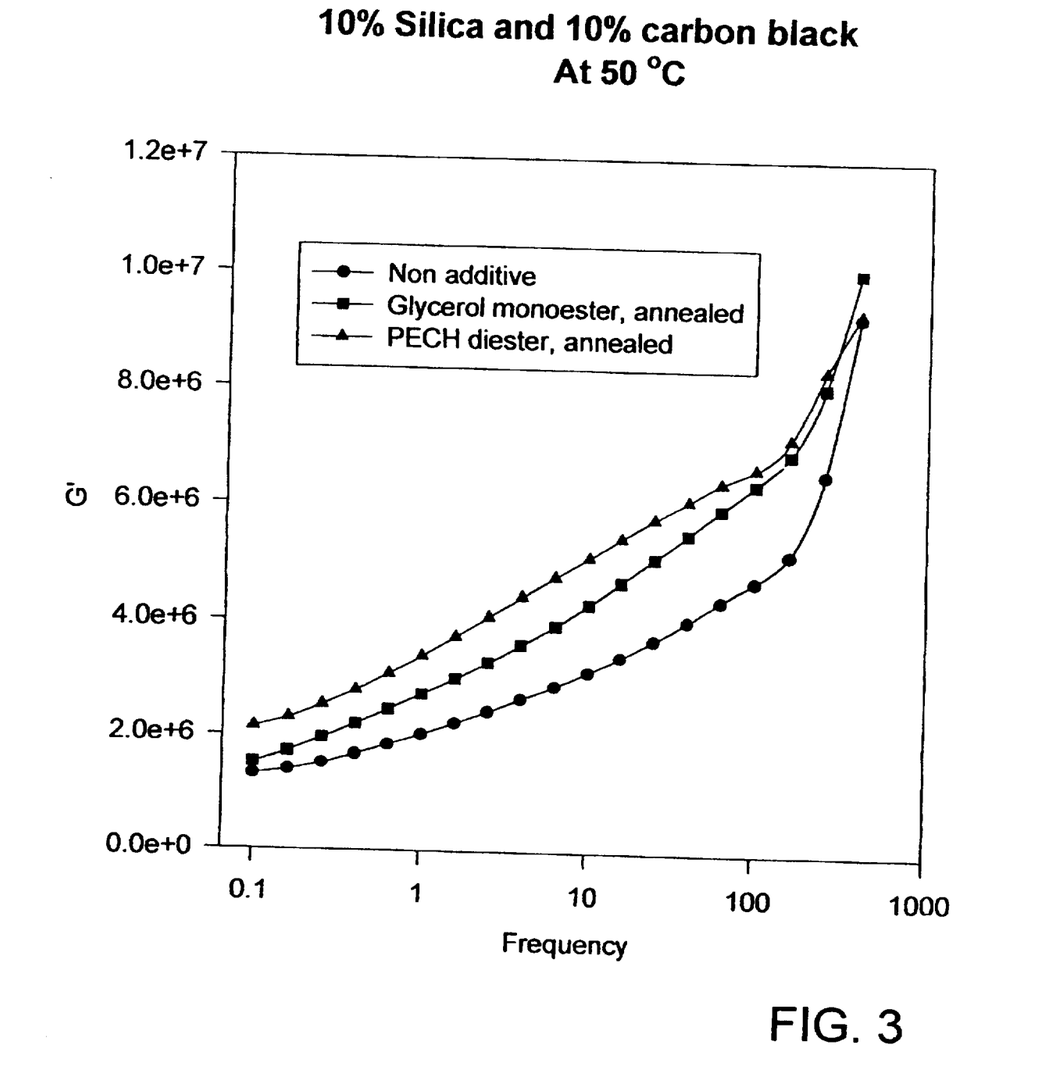
FIG. 3 is a graphical representation of the storage modulus (G') versus frequency of elastomeric materials containing 10 % by weight silica and 10 % by weight carbon black.
Figure 4:
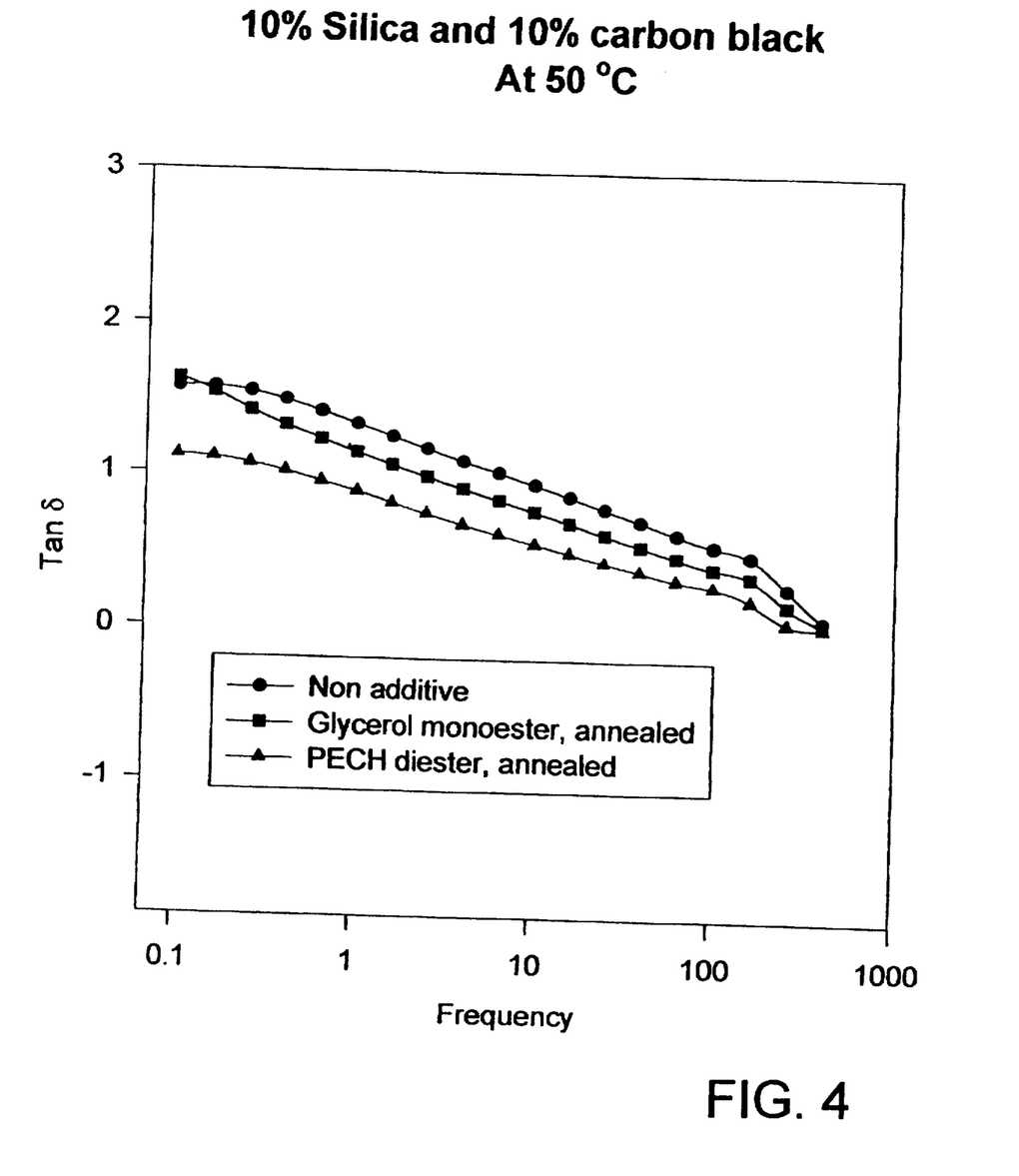
FIG. 4 is a graphical representation of the tan δ versus frequency of elastomeric materials containing 10 % by weight silica and 10 % by weight carbon black.

Rheological measurements on compression molded samples using a TOFA monoester of glycerol which was heat treated after mixing with the silica for 30 minutes at 200° C. as a dispersing agent for the silica at a loading of 10 % by weight silica and 10% by weight carbon black or 20 % by weight silica in polyisoprene show that the storage modulus (G') was increased relative to formulations which contain silica and no dispersing agent (FIGS. 1 and 3).

When a TOFA/PECH diester was heat treated with silica at 200° C. for 30 minutes and then compounded with polyisoprene at a loading of 10% by weight silica and 10% by weight carbon black or 20 wt. % silica, substantially all silica coalescence in the cured rubber film was suppressed as shown by microscopy. Cured samples showed an increase in G' and a decrease in tan δ relative to a formulation which contained no additive (FIGS. 1 to 4). Increased stiffness with reduced chain motion (loss) is characteristic of good adhesion between the filler and the polymeric matrix.

As demonstrated by the foregoing illustrative examples, a rosin or TOFA diester of PEG is preferably used as an additive for an elastomeric material containing silica when dispersion of the silica is an important consideration. When an increase in adhesion of the silica to the elastomeric matrix is important, a rosin or TOFA diester of PECH is preferably used as an additive in the formulation.

The particular additive selected to be used with silica is selected based on the silica loading and the properties of the elastomeric material, i.e., the polarity, olefmic character, etc. of the elastomer. Selection criteria also depends on whether dispersion (speed of mixing, particle size) is the property desired or whether adhesion is the most important property. For example, for most applications, the fatty acid derived additives have the broadest utility in the widest variety of elastomers based on the solubility of these additives in the elastomers. However, additives derived from rosins are more soluble and thus more compatible with elastomeric formulations containing substantial amounts of SBR or chloroprene.

Having described the invention and the preferred embodiments thereof, it will be recognized by those of ordinary skill that the invention may be subject to changes and variations within the spirit and scope of the appended claims.

What is claimed is:

1. An elastomeric composition comprising an elastometric matrix including from about 1 to about 40 wt. % silica and from about 0.1 to about 20 weight % of an A-B-A block copolymer additive having A-blocks derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol.

2. The composition of claim 1 wherein the elastomeric matrix contains from about 60 to about 98.9 percent by weight of an elastomer.

3. The composition of claim 1 wherein the elastomeric matrix is selected from the group consisting of cross-linked polyisoprene (PI), natural rubber, polybutadiene (PBD), styrene-butadiene rubber (SBR) and ethylene-propylene-diene monomer (EPDM).

4. The composition of claim 1 wherein from about 0.25 to about 0.5 parts of additive are used per part of silica.

5. The composition of claim 1 wherein the A-blocks of the additive are derived from one or more unsaturated fatty acids and the B-block is derived from PEG wherein the PEG has a number average molecular weight of from about 300 to about 500 daltons.

6. The composition of claim 1 wherein the A-blocks of the additive are derived from one or more tall oil fatty acids (TOFA) and the B-block is derived from PEG wherein the PEG has a number average molecular weight of from about 300 to about 500 daltons.

7. The composition of claim 1 wherein the A-blocks of the additive are derived from rosin and the B-block is derived from PEG wherein the PEG has a number average molecular weight of from about 300 to about 500 daltons.

8. The composition of claim 1 wherein the A-blocks of the additive are derived from one or more unsaturated fatty acids and the B-block is derived from a PECH diol wherein the PECH diol has a number average molecular weight of from about 1000 to about 1500 daltons.

9. The composition of claim 1 wherein the A-blocks of the additive are derived from one or more tall oil fatty acids (TOFA) and the B-block is derived from PECH diol wherein the PECH diol has a number average molecular weight of from about 1000 to about 1500 daltons.

10. The composition of claim 1 wherein the A-blocks of the additive are derived from rosin and the B-block is derived from PECH diol wherein the PECH diol has a number average molecular weight of from about 1000 to about 1500 daltons.

11. A method for making an elastomeric material which comprises compounding an elastomer selected from the group consisting of polyisoprene, polybutadiene, styrene-butadiene rubber (SBR) and ethylene-propylene-diene monomer (EPDM) and mixtures thereof with a preblended mixture comprising silica and from about 5 to about 50 % by weight based on the total weight of the mixture of an A-B-A block copolymer additive having A-blocks derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol and crosslinking the elastomeric material to provide an elastomeric matrix with the silica dispersed therein.

12. The method of claim 11 further comprising heating the mixture of silica and additive to a temperature in the range of from about 180° to about 220° C. for from about 10 minutes to about 1 hour prior to compounding the mixture and elastomer.

13. The method of claim 11 further comprising dissolving the additive in a solvent selected from the group consisting of toluene, xylene, alkanes and petroleum oil prior to mixing the additive with silica.

14. The method of claim 13 further comprising heating the mixture of silica and additive to a temperature in the range of from about 1800° to about 220° C. for from about 10 minutes to about 1 hour prior to compounding the mixture and elastomer.

15. The method of claim 11 wherein the silica is blended with from about 20 to about 35% by weight additive based on the total weight of additive and silica.

16. The method of claim 11 wherein the A-blocks of the additive are derived from one or more unsaturated fatty acids and the B-block is derived from PEG wherein the PEG has a number average molecular weight of from about 300 to about 500 daltons.

17. The method of claim 11 wherein the A-blocks of the additive are derived from one or more tall oil fatty acids (TOFA) and the B-block is derived from PEG wherein the PEG has a number average molecular weight of from about 300 to about 500 daltons.

18. The method of claim 11 wherein the A-blocks of the additive are derived from rosin and the B-block is derived from PEG wherein the PEG has a number average molecular weight of from about 300 to about 500 daltons.

19. The method of claim 11 wherein the A-blocks of the additive are derived from one or more unsaturated fatty acids and the B-block is derived from a PECH diol wherein the PECH diol has a number average molecular weight of from about 1000 to about 1500 daltons.

20. The method of claim 11 wherein the A-blocks of the additive are derived from one or more tall oil fatty acids (TOFA) and the B-block is derived from PECH diol wherein the PECH diol has a number average molecular weight of from about 1000 to about 1500 daltons.

21. The method of claim 11 wherein the A-blocks of the additive are derived from rosin and the B-block is derived from PECH diol wherein the PECH diol has a number average molecular weight of from about 1000 to about 1500 daltons.

22. An elastomeric material made by the method of claim 11.

23. A method for making an elastomeric material which comprises mixing silica with an additive selected from the group consisting of a rosin acid or fatty acid monoester of glycerol and a A-B-A block copolymer having A-blocks derived from the group consisting of rosin acids and fatty acids and a B-block having a number average molecular weight in the range of from about 200 to about 2500 daltons derived from the group consisting of a polyethylene glycol (PEG) and a polyepichlorohydrin (PECH) polyol, heating the mixture of silica and additive to a temperature in the range of from about 180° to about 220° C. from about 10 minutes to about 1 hour, compounding the heat treated mixture with an elastomer and crosslinking the elastomer to provide an elastomeric material containing silica, additive and crosslinked elastomer.

24. The method of claim 23 further comprising dissolving the additive in a solvent selected from the group consisting of toluene, xylene, alkanes and petroleum oil prior to mixing the additive with silica.

25. The method of claim 23 wherein the elastomer is selected from the group consisting of polyisoprene (PI), natural rubber, polybutadiene (PBD), styrene-butadiene rubber (SBR) and ethylene-propylene-diene monomer (EPDM).

26. The method of claim 23 wherein the silica is mixed with from about 20 to about 35% by weight additive based on the total weight of additive and silica.

27. A method of claim 23 wherein the wherein the A-blocks of the A-B-A block copolymer additive are derived from one or more unsaturated fatty acids and the B-block is derived from PEG wherein the PEG has a number average molecular weight of from about 300 to about 500 daltons.

28. The method of claim 23 wherein the additive is an A-B-A block copolymer having A-blocks derived from one or more tall oil fatty acids (TOFA) and a B-block derived from PEG wherein the PEG has a number average molecular weight of from about 300 to 500 daltons.

29. The method of claim 23 wherein the additive is an A-B-A block copolymer having A-blocks derived from rosin and a B-block derived from PEG wherein the PEG has a number average molecular weight of from about 300 to about 500 daltons.

30. The meethod of claim 23 wherein the additive is an A-B-A block copolymer having A-blocks derived from one or more unsaturated fatty acids and a B-block derived from a PECH diol wherein the PECH diol has a number average molecular weight of from about 1000 to about 1500 daltons.

31. The method of claim 23 wherein the additive is an A-B-A block having A-blocks derived from one or more tall oil fatty acids (TOFA) and a B-block derived from PECH diol wherein the PEch diol has a number average molecular weight of from about 1000 to about 1500 daltons.

32. The method of claim 23 wherein the additive is an A-B-A block copolyer having A-blocks derived from rosin and a B-block derived from PECH diol wherein the PECH diol has a number average molecular weight of from about 1000 to about 1500 daltons.

33. An elastomeric material made by the method of claim 23 wherein the additive is the A-B-A block copolymer additive having A-blocks derived from the group consisting of rosin acids and fatty acids and a B-block having a number average molecular weight in the range of from about 200 to about 2500 daltons drived from the group consisting of polyethylene glycol (PEG) and a polyepichlorohydrin (PECH) polyol.

* * * * *

UNITED STATES PATENT AND TRADEMARK OFFICE
CERTIFICATE OF CORRECTION

PATENT NO. : 5,777,013
DATED : July 7, 1998
INVENTOR(S) : Eric S. Gardiner and Xinya Lu It is certified that error appears in the above-identified patent and that said Letters Patent is hereby corrected as shown below:

Column 4, line 13, change "olefmic" to -- olefinic --.
Column 4, line 16, change "(P)" to -- (PI) --.
Column 4, line 32, change "$C_8$" to -- $C_{18}$ --.
Column 7, line 59, change "finnel" to -- funnel --.
Column 7, line 67, change "iL" to -- mL --.
Column 9, line 36, change "3and" to -- 3 and --.
Column 9, line 39, change "niL" to -- mL --.
Column 13, line 28, change "olefimic" to -- olefinic --.
Column 14, line 35, change "apoly- to -- a poly --.
Column 14, line 41, change "180°to" to -- 180° to --.
Column 14, line 50, change "1800°" to -- 180° --.

Column 16, line 27, change "PEch" to -- PECH --.

Signed and Sealed this

Third Day of November, 1998

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO : 5,777,013

DATED : July 7, 1998

INVENTOR(S) : Eric S. Gardiner and Xinya Lu

It is certified that error appears in the above-identified patent and that said Letters Patent is hereby corrected as shown below:

Column 16, line 19, change "meethod" to -- method --.

Column 16, line 39, change "drived" to -- derived --.

Signed and Sealed this

Sixth Day of April, 1999

Attest:

Attesting Officer

Q. TODD DICKINSON

Acting Commissioner of Patents and Trademarks